Jan. 13, 1948.   W. A. RAY   2,434,433
CONTROL CIRCUIT
Filed Dec. 9, 1942
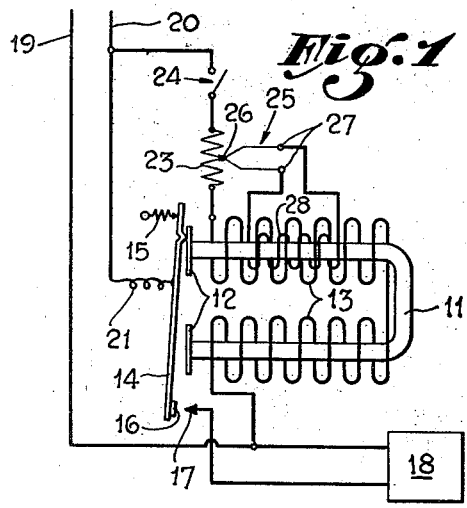
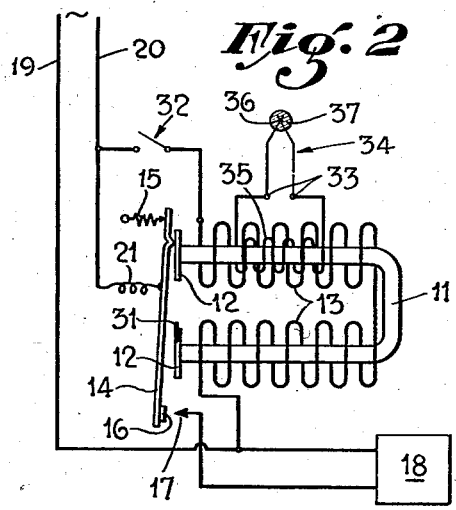
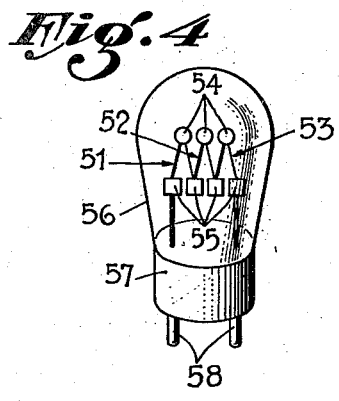
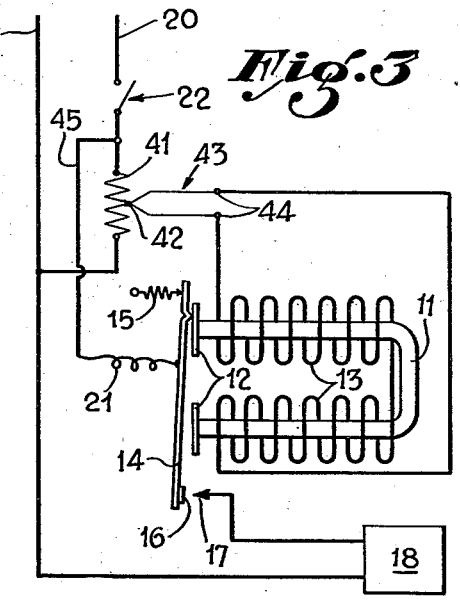
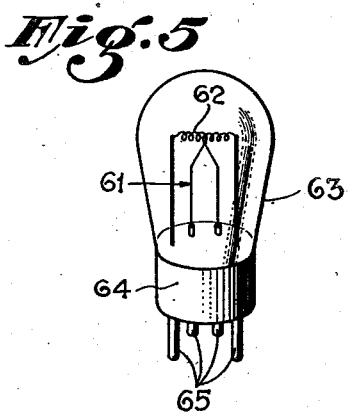
Inventor:
WILLIAM A. RAY,
By John H. Rouse,
Attorney.

Patented Jan. 13, 1948

2,434,433

UNITED STATES PATENT OFFICE 2,434,433

CONTROL CIRCUIT

William A. Ray, Los Angeles, Calif., assignor to General Controls Co., a corporation Application December 9, 1942, Serial No. 468,367

9 Claims. (Cl. 175—320)

My present invention relates to time delay systems and circuits, and has for its main object the provision of a system including an electromagnetic relay, and means for so controlling the operation of the relay that its movement toward energized or deenergized position is delayed for a predetermined interval subsequent to the operation of switching means controlling the system.

Another object is the provision, in a system of the character described, of thermoelectric generating means, the heating of which is controlled by said switching means, for energizing the relay; the generation of energy by the device lagging behind the application of heat thereto, so that the operation of the relay is delayed. An important advantage of such an arrangement lies in the elimination of moving and wearing parts, such as electrical contacts, gear-trains, etcetera, employed in conventional time delay systems.

A specific object of the invention is the provision of a circuit for normally energizing the relay and including a heating element, and a thermoelectric generating device heated by said element and connected to an additional coil winding for the relay, whereby the relay is maintained in energized condition for a predetermined period subsequent to deenergization of the normal energizing circuit.

Another specific object is the provision, in a system of the general character described in the preceding object, of a circuit for the thermoelectric generating device which is coupled to the normal energizing circuit, so that the thermoelectric device is heated solely by current flow induced in its circuit by A. C. flow in the normal energizing circuit.

Still another specific object is the provision, in combination with a relay, of a thermoelectric generating device which serves as the sole means for energizing the relay; the generation of the device lagging behind the operation of switching means controlling the heating thereof, so that operation of the relay is delayed.

Other objects and advantages of the invention will be found in the description, the drawing, and in the claims; and for full understanding of the invention, reference may be had to the following detailed description and accompanying drawing, wherein:

Figure 1 is a diagrammatic view of a time delay control system embodying my invention;

Figures 2 and 3 are similar views of modified forms of the invention; and

Figures 4 and 5 are perspective views of thermoelectric generating devices adapted for use in the systems shown in the other figures.

In each of the diagrams of Figs. 1, 2 and 3 there is shown, by way of example, an electromagnetic relay of the general type disclosed in my copending application, Serial No. 464,965, filed December 5, 1942, now Patent No. 2,381,080, dated August 7, 1945, in which application it is taught that, when the relay is operated at very low flux densities, its relative power consumption can be greatly reduced by providing its core with enlarged pole-face-defining heads; however, it is to be understood that the present invention is in no way limited to that construction. The relay comprises a U-shaped core 11 having the aforementioned enlarged heads 12, and an energizing coil 13 wound around both of its side arms. Fulcrumed on one of the heads 12 is an armature 14 which is attractable toward the other of the heads when the relay is energized, and is biased in the opposite direction by a compression spring 15. Carried by the armature is a contact 16 which is engageable with a fixed contact 17 when the armature is attracted. In each of the diagrams, an electrically operable load for the relay is indicated at 18, one terminal of the load being connected directly to one of a pair of electric service lines 19 and 20, the other load terminal being connected, when the armature is in its attracted position, to the other of the service lines through contacts 16 and 17 and a flexible armature connection 21; in Fig. 3 there being a switch 22 in this circuit.

Referring now more particularly to Fig. 1, it will be seen that the upper end of the coil winding 13 is connected, through a resistance or heater element 23 and a switch 24, to the service line 20; the lower end of the coil winding being connected directly to the other service line 19. When switch 24 is closed, current then flows from the service lines through element 23 and coil 13 in an amount sufficient to cause immediate attraction of the armature, and, incidentally, heating of the element. Generally indicated at 25 is a thermoelectric generating device or thermocouple composed of a pair of thermoelectrically dissimilar elements joined together at one of their respective ends to form a hot junction 26 which is disposed in good heat-transfer relation to the heating element 23. Connected to the other, or cold-junction, ends 27 of the thermocouple is an additional relay coil 28 which is wound around the upper arm of the core. When switch 24 is closed, the thermocouple is heated and the energy then generated thereby produces a magnetic flux in the core, which, however, does not materially affect the normal energization of the relay while current from the service lines is also flowing in the main coil winding 13. The hot-junction portion of the thermocouple and/or the heater unit are designed to cool relatively slowly after heating, so that when switch 24 is opened, the generation of energy by the thermocouple continues and is of an amount sufficient to cause retention of the armature in its attracted position for an interval which is determined by the characteristics of the thermocouple and its associated circuit, and of the heating element. The delay interval before the relay is operated to open position can conveniently be varied by changing the heating or dissipation value of the element 23. The hot junction 26 of the thermocouple is either welded directly to the heater element 23, or is arranged closely adjacent thereto so that it is heated only by radiation. The delay interval is not altered by change in the ambient temperature, since both hot and cold junctions of the thermocouple are equally affected by such change. Also, it will be apparent that variation of voltage of the service lines has but little effect on the delay as that interval is determined mainly by the cooling rate. Another advantage of the system of Fig. 1 is due to the fact that the relay armature drops-out abruptly when the energization is sufficiently decreased, so that there is a snap-action of its load-controlling contacts—as distinguished from the slow-opening effect produced by a conventional bimetallic time delay device. To minimize reduction of generation due to conduction of heat from the hot to the cold junction of the thermocouple when its elements are relatively short and the heating is prolonged, the thermocouple may be of the type disclosed in my copending application, Serial No. 387,103, filed April 5, 1941, now Patent No. 2,337,000, issued December 14, 1943, wherein means are provided for compensating for such effect.

The system shown in Fig. 2 is similar to that of Fig. 1 in that its purpose likewise is to effect delayed deenergization of the load. However, while in the system of Fig. 1 either A. C. or D. C. may be employed for energizing the main coil winding, the thermocouple of Fig. 2 is arranged for inductive heating and hence in that system A. C. must be employed.

In Fig. 2, the relay structure and its normal control circuits are substantially the same as in Fig. 1 except that one pole head of the core is shown provided with the customary shading-coil 31. The heater element of Fig. 1 is eliminated, the upper end of the main coil winding 13 being connected directly to service line 20 by a switch 32. The cold-junction ends 33 of thermocouple 34 are connected to an additional coil 35 wound around an arm of core 11 so that, when switch 32 is closed, flow of A. C. in the main coil winding 13 effects induction of corresponding A. C. flow in the thermocouple circuit. Since the materials of which the thermocouple is constructed have relatively high resistivity, they are heated to a considerable degree by this current flow. Surrounding the hot junction 36 of the thermocouple is a thermal insulating mass 37, of material such as asbestos, which serves to maintain the temperature of the hot junction 36 above that of the uninsulated cold junctions 33 so that thermoelectric energy is generated which is effective, when switch 32 is opened, to maintain the relay armature in its attracted position for the desired delay interval. The arrangement shown in Fig. 2 has particular utility when it is desired to mechanically isolate the thermocouple from the relay; or when the relay is of the heavy-duty type so that it would be impracticable to insert a relatively small heating element in its circuit, as in Fig. 1.

The system shown in Fig. 3 differs from those shown in Figs. 1 and 2 in that it is adapted to effect delayed energization (instead of delayed deenergization) of the relay. In Fig. 3, a heater element 41 is connected by switch 22 directly across the service lines 19 and 20 and serves to heat the hot junction 42 of a thermocouple 43, the cold-junction ends 44 of the thermocouple being connected to the main coil winding 13 of the relay. After switch 22 is closed, an interval elapses before the generation of the thermocouple becomes sufficient to cause attraction of the armature, whereupon the circuit of the load device 18 is completed through contacts 16, 17 and switch 22. Upon opening the switch, the load is immediately deenergized, deenergization of the relay itself occurring only after sufficient cooling of the thermocouple. If it is desired to delay the deenergization of the load as well as its energization, the armature lead 45 is connected directly to the service line 20, instead of through the switch.

In Fig. 4 is shown a unit, of the plug-in type designed for mounting in a radio socket, which includes a thermoelectric generating device of the type particularly adapted for use in the system of Fig. 2. The generating device consists of a plurality of thermocouples 51, 52 and 53 interconnected in electrical series to form a thermopile. Surrounding the hot-junction end of each thermocouple is a thermal insulating mass 54 similar to that shown at 37 in Fig. 2, and attached to each of the cold-junction ends of the thermocouples is a heat-radiating plate or fin 55 which aids dissipation of heat from the cold junctions so that, in operation, they are maintained at a temperature lower than that of the insulated hot junctions. The thermopile is mounted within a glass globe 56 having a base 57 which is provided with terminal pins 58; the globe being evacuated or else filled with an inert gas to minimize deterioration of the thermocouple elements. It is to be understood that the volume of the globe, and the space between its side walls and the cold junctions 55, must be sufficiently large that the requisite difference of temperature between the hot and cold junctions is preserved in continued operation. However, the general proportions indicated in the figure are correct under normal conditions (as in the system of Fig. 2) since the temperature at the confined hot junctions normally need not be higher than will produce even dull-red radiation.

The plug-in unit shown in Fig. 5 is for use in the systems of Figs. 1 and 3 and comprises a thermocouple 61, the hot-junction end of which is welded to a heating coil or element 62. The elements are mounted, as in Fig. 4, within a globe 63 having a base 64 which is provided with terminal pins 65 for connecting the thermocouple and the heater unit in their respective circuits.

While I have herein shown and described specific embodiments of my invention, I wish it to be understood that modifications may be made without departing from the spirit of the invention, and that I intend therefore to be limited only by the scope of the appended claims.

I claim as my invention:

1. In a time delay system: an electromagnetic relay comprising a core and an armature cooperable therewith; a circuit for operatively energizing said relay including a coil winding for the relay; switching means for controlling said circuit; and an electrically-heated thermoelectric generating device, the heating of which is effected by passage of current through said circuit, for additionally energizing said relay; said thermoelectric device being so constructed and arranged that the generation of energy thereby continues after interruption of said circuit by said switching means, so that the deenergization of the relay is then delayed for a predetermined interval.

2. In a time delay system: an electromagnetic relay comprising a core and an armature attractable theretoward; a circuit for operatively energizing said relay including a coil winding for said core; switching means for controlling said circuit; an electrically-heated thermoelectric generating device, the heating of which is effected by passage of current through said circuit; and an additional circuit for energizing said core and including said thermoelectric generating device; said thermoelectric device being so constructed and arranged that the generation of energy thereby continues after interruption of said first-mentioned circuit by said switching means, so that the current flow then produced thereby in said additional circuit effects retention of said armature in attracted position for a predetermined interval.

3. In a time delay system: an electromagnetic relay comprising a core and an armature cooperable therewith; a circuit for operatively energizing said relay including a coil winding for said core; switching means for controlling said circuit; a thermoelectric generating device having a hot junction disposed in good heat-transfer relation to a portion of said circuit which is heated by passage of current therethrough; and an additional circuit for energizing said core and including said thermoelectric generating device; said thermoelectric device being so constructed and arranged that the generation of energy thereby continues after interruption of said first-mentioned circuit by said switching means, so that the current flow then produced thereby in said additional circuit effects delayed energization of the relay for a predetermined interval.

4. In a time delay system: an electromagnetic relay comprising a core and an armature attractable theretoward; a circuit for operatively energizing said relay including a coil winding for said core; an electric heating element in said circuit; switching means for controlling said circuit; a thermoelectric generating device having a hot junction disposed in good heat-transfer relation to said heating element; and an additional circuit for energizing said core and including said thermoelectric generating device; said thermoelectric device and said heating element being so constructed and interrelated that the generation of energy by the device continues after interruption of said first-mentioned circuit by said switching means, so that the current flow then produced in said additional circuit effects retention of said armature in attracted position for a predetermined interval.

5. In a time delay system: an electromagnetic relay comprising a core and an armature attractable theretoward; a circuit for operatively energizing said relay including a coil winding for said core; an electric heating element in said circuit; switching means for controlling said circuit; a thermoelectric generating device having a hot-junction element disposed in good heat-transfer relation to said heating element; and an additional coil winding for said core and connected to said thermoelectric generating device; one of said elements being designed to cool slowly so that the generation of energy by the thermoelectric generating device continues after interruption of said circuit by said switching means, and the current flow then produced in said additional coil winding effects retention of said armature in attracted position for a predetermined interval.

6. In a time delay system: an electromagnetic relay comprising a core and an armature attractable theretoward; an A. C. circuit for operatively energizing said relay and including a coil winding for said core; switching means for controlling said circuit; an additional coil winding for said core; and a thermoelectric generating device connected in circuit with said additional coil winding and having a junction adapted to be heated by current flow induced in the circuit thereof by flow of A. C. in said first-mentioned coil winding; said thermoelectric device being so constructed and arranged that the generation of energy thereby continues after interruption of the A. C. flow by said switching means, and is then effective to so energize said core that said armature is retained in attracted position for a predetermined interval.

7. In a time delay system: an electromagnetic relay comprising a core and an armature attractable theretoward; an A. C. circuit for operatively energizing said relay and including a coil winding for said core; switching means for controlling said circuit; an additional coil winding for said core; and a thermoelectric generating device connected in circuit with said additional coil winding and having a junction heated by A. C. flowing therethrough and induced in said additional coil winding by flow of A. C. in said first-mentioned coil winding; said heated-junction of the device being thermally insulated so that its temperature rises above that of the remainder of its circuit to effect generation of D. C., which generation continues after interruption by said switching means of the A. C. flow in said first-mentioned coil winding, so that said armature is retained in attracted position for a predetermined period by the flow of D. C. in said additional coil winding.

8. In a system for delaying supply of electrical energy from a source to a load during a predetermined interval subsequent to the closing of a switch for controlling energization of the load: an electromagnetic relay comprising a core, a coil winding for magnetically energizing the core, and an armature cooperable with the core; a thermoelectric generating device for supplying electrical energy to said coil winding; electrical means for heating said thermoelectric device, said thermoelectric device being adapted to generate energy continuously while heated; a circuit controlled by said switch for continuously supplying energy from said source to said heating means while the switch is closed; and independent switching means, operated by movement of said armature upon energization of said core, for connecting said load to said source.

9. In a system for delaying supply of electrical energy from a source to a load during a predetermined interval subsequent to the closing of a switch for controlling energization of the load: an electromagnetic relay comprising a core, a coil winding for magnetically energizing the core, and an armature cooperable with the core; a thermoelectric generating device for supplying electrical energy to said coil winding; an electrical element for heating said thermoelectric device, said thermoelectric device being adapted to generate energy continuously while heated; a circuit controlled by said switch for continuously supplying energy from said source to said heating element while the switch is closed; and independent switching means, operated by movement of said armature upon energization of said core, for connecting said load to said source; said thermoelectric device having a hot-junction element disposed in good heat-transfer relation to said heating element, one of said elements being designed to heat slowly so that generation of energy by said device, in an amount sufficient to cause operative movement of said armature by said core, is delayed.

WILLIAM A. RAY.

REFERENCES CITED

The following references are of record in the file of this patent:

UNITED STATES PATENTS

| Number | Name | Date |
|---|---|---|
| Re. 20,476 | Wilson et al. | Aug. 17, 1937 |
| 880,272 | Bristol | Feb. 25, 1908 |
| 2,240,812 | Sparrow | May 6, 1941 |
| 2,265,294 | Lange | Dec. 9, 1941 |
| 1,861,929 | Lowry | June 7, 1932 |
| 1,893,847 | Simpson | Jan. 10, 1933 |